United States Patent [19]
Haines et al.

[11] Patent Number: 5,983,671
[45] Date of Patent: Nov. 16, 1999

[54] APPARATUS AND METHOD FOR MANUFACTURING FOAMED MATERIAL

[75] Inventors: Steven C. Haines; Tai B. Bixby, both of Santa Fe, N.Mex.; Ronald D. Argent, Graysville, Pa.; Christopher J. Hoyle, Houston, Pa.; David E. Wiltrout, Connellsville, Pa.

[73] Assignee: Andrew Ungerleider, Santa Fe, N.Mex.

[21] Appl. No.: 08/797,101

[22] Filed: Feb. 7, 1997

Related U.S. Application Data

[60] Provisional application No. 60/011,336, Feb. 8, 1996.

[51] Int. Cl.$^6$ ........................................... B28B 5/02
[52] U.S. Cl. ................................. 65/22; 65/17.3; 65/20; 65/114; 65/144
[58] Field of Search .................................... 425/335, 371, 425/363, 233, 236, 4 C, 817 C, 185, 195; 65/17.3, 20, 22, 114, 141, 144

[56] References Cited

U.S. PATENT DOCUMENTS

| | | | |
|---|---|---|---|
| 2,620,597 | 12/1952 | Ford | 65/22 |
| 3,056,184 | 10/1962 | Blaha | 264/43 |
| 3,348,933 | 10/1967 | Schulz | 65/22 |
| 3,432,580 | 3/1969 | Heidrich et al. | 264/43 |
| 3,527,587 | 9/1970 | Velev et al. | 65/22 |
| 3,532,480 | 10/1970 | D'Eustachio | 65/20 |
| 3,574,583 | 4/1971 | Goldsmith | 65/22 |
| 3,585,014 | 6/1971 | Malesak | 65/22 |
| 3,607,170 | 9/1971 | Malesak | 65/22 |
| 3,972,667 | 8/1976 | Hanusa | 425/224 |
| 4,038,063 | 7/1977 | Williams et al. | 65/22 |
| 4,043,719 | 8/1977 | Jones | 425/115 |
| 4,050,873 | 9/1977 | Brumlik et al. | 425/371 |
| 4,124,365 | 11/1978 | Williams et al. | 65/22 |
| 4,190,416 | 2/1980 | North | 432/128 |
| 4,212,635 | 7/1980 | North | 432/239 |
| 4,274,825 | 6/1981 | North | 432/13 |
| 4,289,521 | 9/1981 | Schymura | 65/144 |

*Primary Examiner*—Sean Vincent
*Attorney, Agent, or Firm*—Robert W. Becker & Associates

[57] ABSTRACT

An apparatus and method for the preferably continuous manufacture of foamed material using a furnace are provided. A two-part mold mechanism is provided that includes an upper portion and a lower portion that are each endless loops and cooperate with one another to form a closed mold within the furnace. The upper and lower portions can each comprise a plurality of transverse mold members that can be easily replaced or exchanged during operation of the apparatus. A feed mechanism is provided for introducing material that is to be foamed to the mold mechanism upstream of the furnace. Scrapers or the like can be provided downstream of the furnace to aid in separating and supporting foamed material from the mold mechanism.

22 Claims, 4 Drawing Sheets

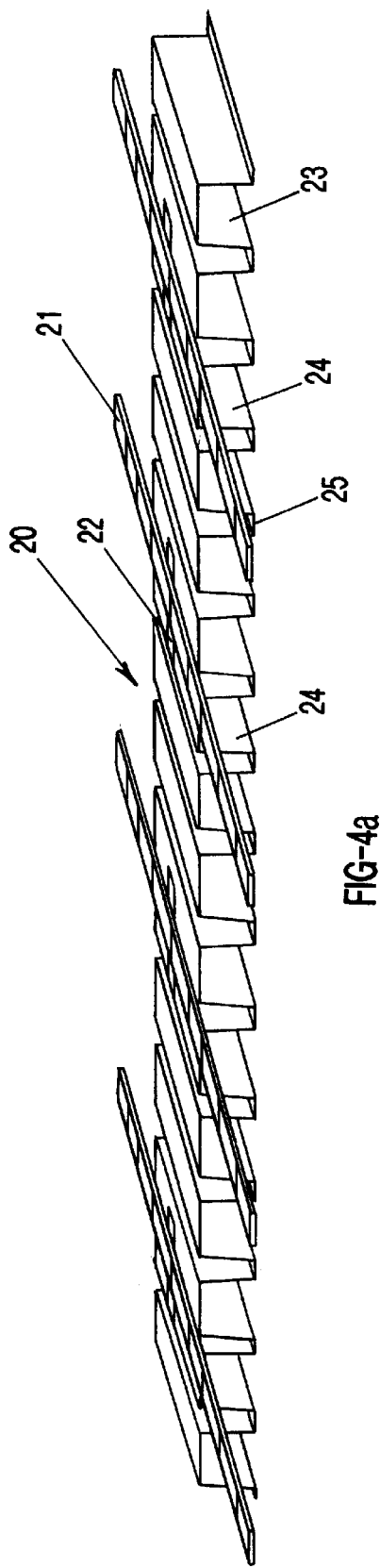
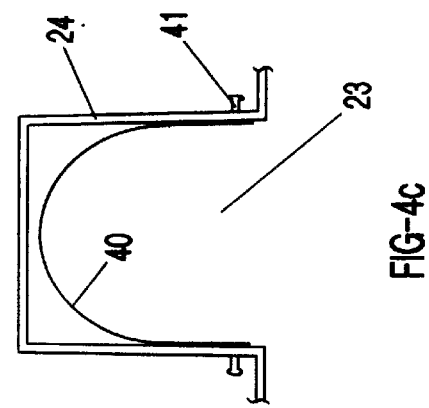
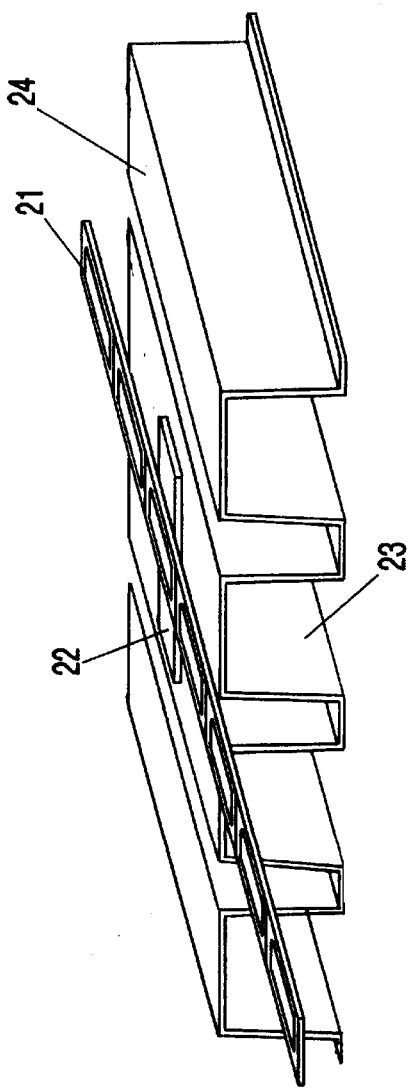

APPARATUS AND METHOD FOR MANUFACTURING FOAMED MATERIAL

This application claims benefit of Provisional application Ser. No. 60/011,336 Feb. 8, 1996.

BACKGROUND OF THE INVENTION

The present invention relates to an apparatus and method for the preferably continuous manufacture of foamed material, such as foamed glass or ceramic material, using a furnace.

Foamed glass and ceramic materials are used in the form of blocks, bricks, sheets and the like having various cross-sectional shapes, including triangular, cylindrical and ovoid. Such material can be used for a great variety of products due to its low density, its abrasivity, its excellent thermal insulating characteristics, and its comparative high strength. The foamed material is generally produced by combining a mixture of glass or ceramic powder and a suitable foaming agent in a mold; the mixture is heated so that it first sinters, then fuses, and then foams, whereby the mixture expands to provide pores or bubbles therein.

In general, the mixture of glass or ceramic powder and foaming agent is heated to about 1250° F. so that the material will sinter or coalesce. The material is then heated to from 1274–1700° F. or higher to form a foamed block that is in a plastic state. This foamed material is then cooled to about 1050° F. to rigidify the surface. The foamed material must be removed from the mold at this time. If not, and if the foamed material is cooled further, the thermal contraction of the mold will exceed the thermal contraction of the foamed material and the mold will "lock on" to the foamed material, especially if it is cooled to mold removal temperatures of from 100–150° F. This can lead to crushing or rupturing of the cooled foamed material, and can make mold removal extremely difficult if not impossible.

Pursuant to heretofore known procedures, all commercially produced foamed glass or ceramic is foamed in discrete molds of various shapes and sizes. The foamed material, which is in the form of blocks or blanks, must be removed from the individual molds at a high temperature, whereupon the molds and lids therefor must be cleaned, refilled, and reinserted into a furnace. The foamed material must then be annealed, cooled, and cut into a finished product configuration from the larger blanks.

In view of the above, it can be seen that it would be advantageous to be able to produce foamed material in a continuous process in order to produce a more economical product. Several attempts have in the past been made to provide such a continuous process. For example, U.S. Pat. Nos. 3,585,014 and 3,607,170, to Malesak, and U.S. Pat. Nos. 4,038,063 and 4,124,365, to Williams, disclose the use of a thin, flexible belt on which to foam material as it travels through a furnace. Such a thin belt does not last long in a hot furnace environment, and it tends to warp, abrade and quickly deteriorate. Lubrication of the belt to restrict wear frequently fails in the hot furnace. In addition, the foamed material frequently sticks to the belt and builds up on the belt, even if release coatings are provided, due to the difficulty of cleaning and recoating the belt with release agent inside the furnace at high temperatures. U.S. Pat. No. 4,289,521, to Schymura, utilizes an overhead trolley to convey continuous molds through a custom built tunnel furnace. The molds are complicated, and rely on hinged sides. Failure of the hinge mechanism in a hot furnace environment would make it necessary to shut down the entire furnace and trolley system in order to remove and replace a failed mold and to clean up spilled foamed material. In addition, the sand seal that is used in the overhead trolley system requires constant replenishment of the sand in order to maintain the heat seal. Other continuous foamed glass systems use molds that are pushed end-to-end through the furnace. The pushing force required to overcome friction in a long furnace can deform the molds, resulting in an irregular continuous strip that would have to undergo additional trimming before it could be used. U.S. Pat. Nos. 3,972,667, Hanusa, 3,574,583, Goldsmith, 3,532,480, D-Eustachio, and 3,056,184, Blaha, utilize some type of roller mechanism in order to align and/or compress the foamed material. The rollers must be constantly coated with a release material in order to prevent build-up of the sticky foamed material, which could deform the continuous product. The use of rollers precludes the production of shapes that do not have flat or parallel surfaces. In addition to the aforementioned drawbacks of prior known processes, these processes also require the use of custom built furnaces, thus greatly adding to the cost of these known processes.

Thus, it is an object of the present invention to not only provide a potentially continuous process for the production of foamed material while avoiding the drawbacks of the heretofore known processes, it is also an object of the present invention to be able to produce finished material having any desired shape, whereby it is merely necessary to cut the finished product to a desired length. A further object of the present invention is to make it possible to change the shapes of the mold being used without having to shut down the apparatus and furnace while making such changes. It is yet another object of the present invention to be able to use a standard furnace.

BRIEF DESCRIPTION OF THE DRAWINGS

These and other objects and advantages of the present invention will appear more clearly from the following specification in conjunction with the accompanying schematic drawings, in which:

FIGS. 4a, 4b and 4c show various details of profiled transverse mold members and their sections.

SUMMARY OF THE INVENTION

The apparatus and method of the present invention are characterized primarily by a mold means that includes an upper portion and a lower portion that are each endless loops and that cooperate with one another to form a closed mold within a furnace, such as a standard tunnel-type furnace, in which a glass or ceramic mixture can be heated to fusion and foamed. Feed means are provided for introducing material that is to be foamed to the mold means upstream of the furnace. One or more scrapers or similar means can be provided for separating foamed material from the mold means at a cooler end of the furnace. The separating means can also be used to support the strip of foamed material that is discharged from the furnace. The discharged strip of foamed material can then be conveyed to a further cooling process for tempering, annealing or the like, and to means for cutting discrete blocks, sheets, etc. from the continuous strip or ribbon of foamed material.

DESCRIPTION OF PREFERRED EMBODIMENTS

Figure 1:
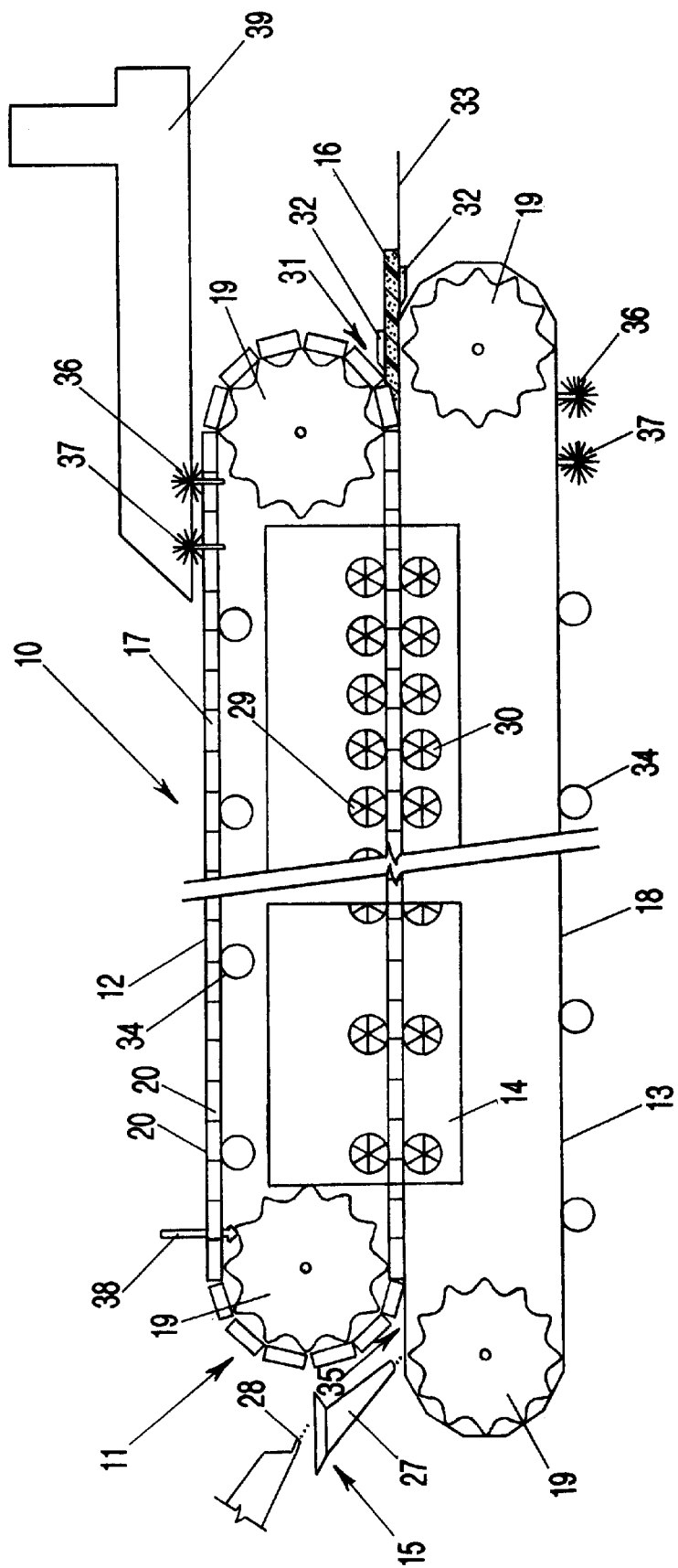
FIG. 1 is a side view illustrating one exemplary embodiment of the inventive apparatus for continuously manufacturing foamed material using a furnace.

Referring now to the drawings in detail, FIG. 1 schematically illustrates one exemplary embodiment of the inventive apparatus 10 for the manufacture of foamed material, such as foamed glass or ceramic material. The apparatus 10, which is also called a mold machine, comprises a mold means 11 that comprises an upper portion 12 and a lower portion 13. The feed and discharge ends of the mold means 11 are shown in greater detail in FIGS. 2 and 3 respectively. The upper portion 12 and the lower portion 13 of the mold means 11 are movable together through an oven or furnace 14 in order to effect foaming of material that is added to the mold means 11 by the feed means 15 shown at the left hand side of FIG. 1; the foamed material 16 is discharged from the mold means 11 at the right hand side of FIG. 1 in a manner to be described in detail subsequently.

As shown in FIG. 1, each upper portion 12 of the mold means 11 is in the form of an endless or continuous loop 17, while each lower portion 13 of the mold means 11 is in the form of an endless or continuous loop 18. Each of the loops 17 and 18 is disposed about gears or wheels 19, whereby for each of the loops 17, 18 one of the wheels 19 is a driven wheel, for example being driven by a non-illustrated motor, for driving the respective loop 17, 18 which then also turns around the other wheel 19, which is mounted so as to be freely rotatable. The loops 17 and 18 of the mold means 11 are rotated at the same speed so that they move together through the furnace 14 at the same rate. The apparatus 10 can also be provided with non-illustrated tensioning means, such as self-adjusting tension means, to compensate for expansion and contraction of components of the mold means as they are heated and cooled.

The endless portion 12 of the mold means 11 comprises a plurality of transverse mold members 20. These transverse mold members are secured to a continuous belt or chain 21, such as a continuous linked stainless steel chain, by means, for example, of pins 22. In the illustrated embodiment, each of the transverse members 20 has a corrugated profiled configuration, with the recessed portions 23 thereof having the shape of a finished foamed strip of material. Each of the transverse mold members 20 can be a continuous piece that extends across the entire width of the upper portion 12 of the mold means 11, or can comprise a series of sections 24 (see FIG. 4b); four such sections 24 are illustrated in FIG. 4a, with the sections 24 being separated from one another as indicated by the division line 25. Furthermore, as illustrated in FIG. 4a, more than one continuous belt or chain 21 can also be provided, whereby in the illustrated embodiment a separate chain 21 is provided for each of the sections 24 of the transverse mold members 20.

Figure 2:
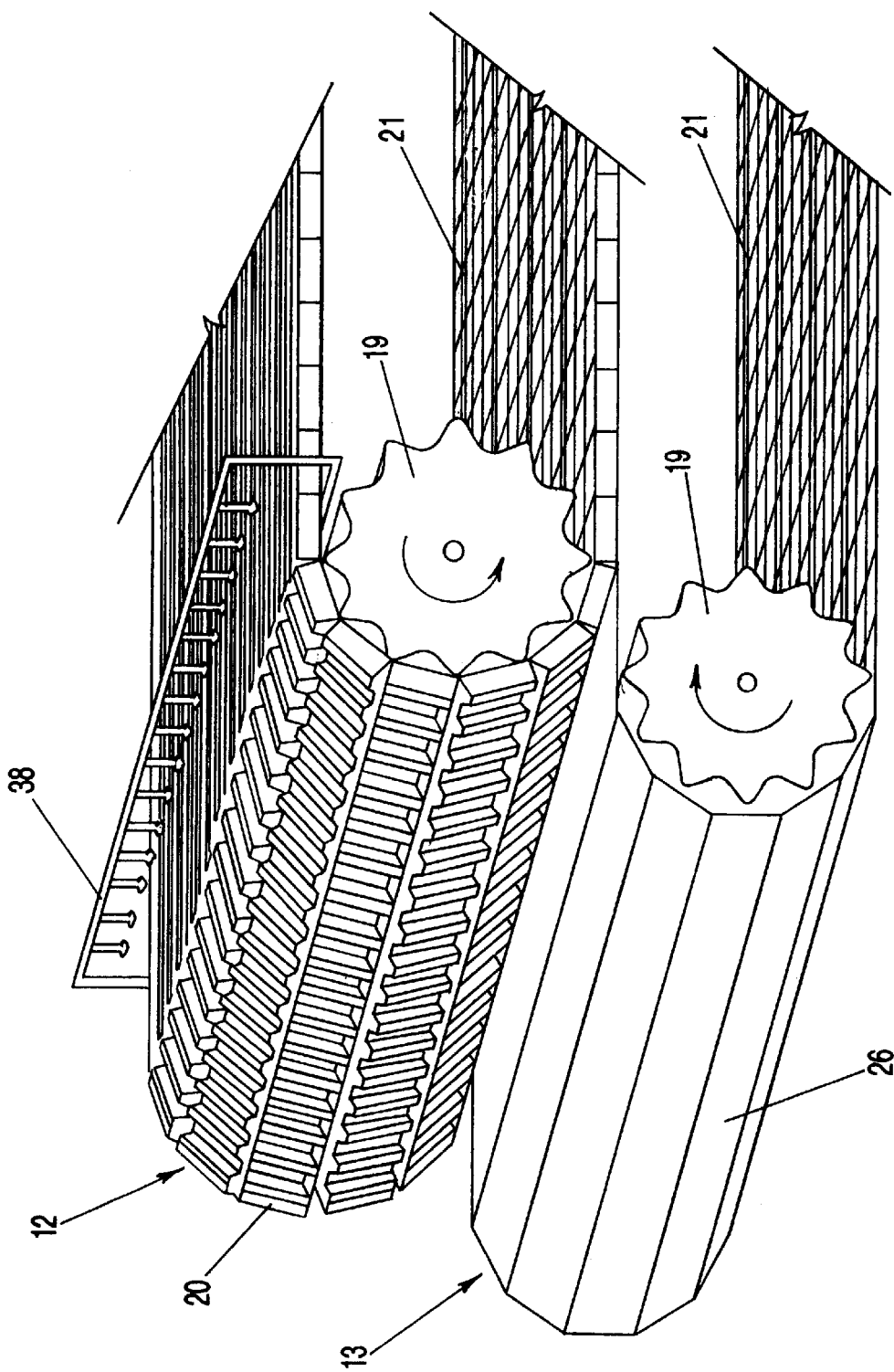
FIG. 2 is an enlarged partial view showing the feeding end of the inventive apparatus.
Figure 3:
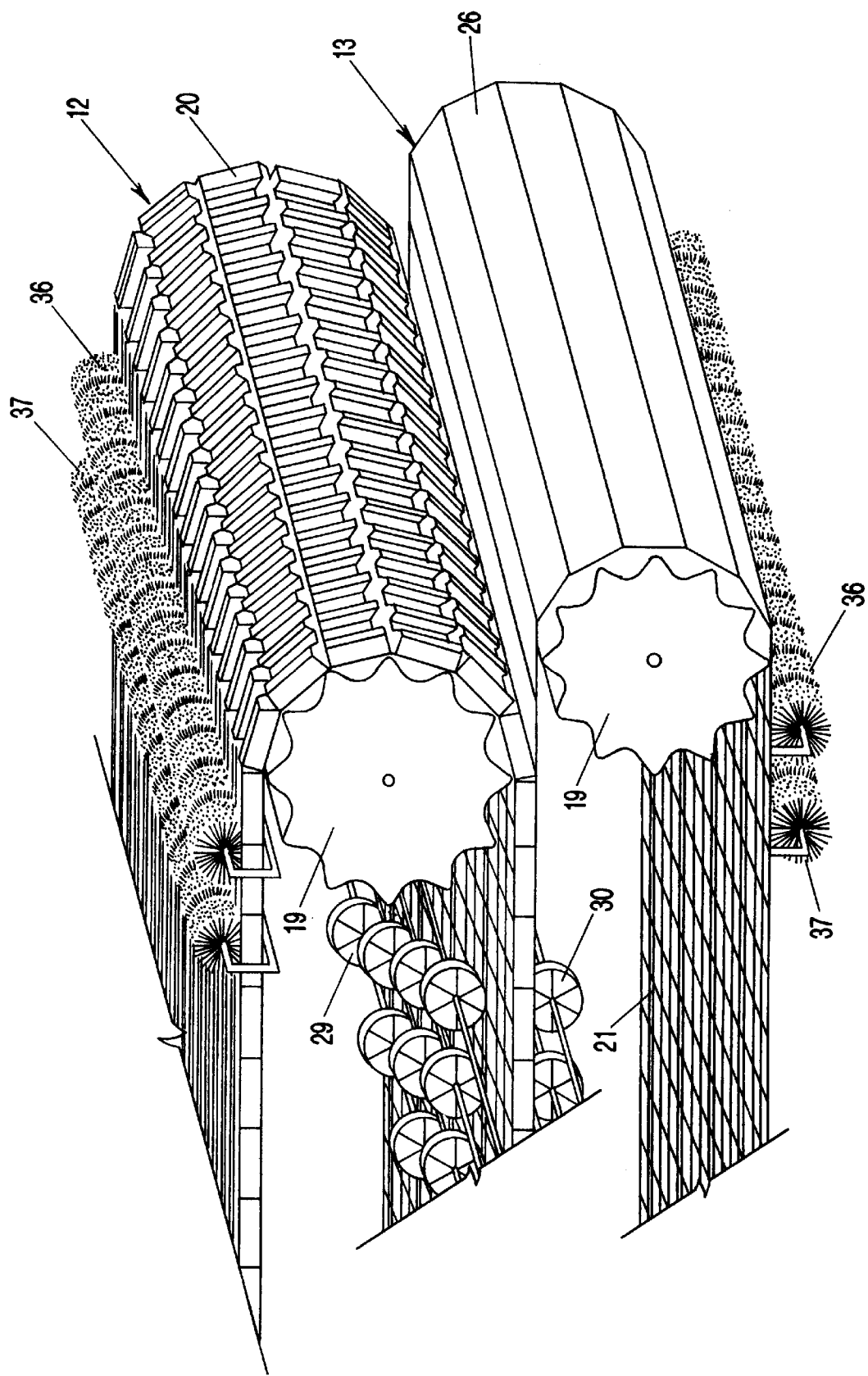
FIG. 3 is an enlarged partial view showing the discharge end of the inventive apparatus.

The lower portion 13 of the mold means 11 comprises a plurality of transverse mold members 26. In the illustrated embodiment, the mold members 26 are shown as flat steel strips, but could also be profiled strips. These transverse mold members 26 can either be continuous as shown in FIGS. 2 and 3, or can be segmented in a manner similar to that described in conjunction with the transverse mold members 20 of the upper portion 12. Again, the transverse mold members 26 are secured to one or more continuous or endless belts or chains 21.

As indicated previously, material that is to be foamed in the furnace 14 is fed to the mold means 11 by feed means 15.

In particular, the feed means 15 can, for example, comprise one or more feeding spouts 27 to which the material indicated the arrow 28 can be fed in any convenient manner. The feeding spout or spouts 27 deposit the material 28 onto the flat transverse mold members 26 of the lower portion 13 of the mold means 11 in a continuous manner in one or more rows in conformity with the number of recessed portions 23 of the profiled transverse mold members 20 of the upper portion 12. The material 28 comprises a foamable mixture of glass or ceramic material along with foaming agent. Enough foamable material 28 is deposited on the transverse mold members 26 such that the recessed portions or cavities 23 of the transverse mold members 20 will be completely filled when foaming occurs in the furnace 14. As the loops 17 and 18 of the mold means 11 move toward the furnace 14, preferably in a continuous manner, although a batch-type operating manner is also conceivable, the transverse mold members 20 of the upper portion 12 come into contact with the transverse mold members 26 of the lower portion 13 to form a continuous closed mold that contains the foamable material 28. In order to keep the transverse mold members 20 and 26 in contact with one another as the loops 17 and 18 move through the furnace 14, hold-down wheels 29 and support wheels 30, which are all preferably adjustable, are provided for respectively holding down the loop 17 of the upper portion 12 and supporting the loop 18 of the lower portion 13. These wheels 29, 30 expediently act upon the continuous chains 21 to which the respective transverse mold members 20, 26 are secured. The purpose of the hold-down wheels 29 and support wheels 30 are to hold the transverse mold members 20, 26 in contact with one another during the foaming process, during which process pressures from the foaming process are generated that would otherwise push the transverse mold members 20, 26 apart.

The furnace 14 comprises two or more parts to provide regions having different temperatures in order to accommodate the various stages of sintering, fusing and foaming. In addition, prior to leaving the furnace 14 the foamed material 16 is cooled to the point that the surface of the material begins to rigidify. This occurs at a temperature where the coefficient of thermal contraction of the foamed material 16 is still greater than that of the material of the transverse mold members 20 and 26. As the foamed, surface-rigidified material 16 exits the furnace 14, the upper and lower portions 12, 13 of the mold means 11 separate from one another, as indicated at the arrow 31 in FIG. 1. Scrapers or similar means 32 are provided on both sides of the foamed material 16 to aid in releasing and supporting the material as it is separated from the transverse mold members 20, 26 and enters a conveying means 33 for conveying the foam material 16 to a further furnace or lehr for subsequent tempering or annealing of the foamed material. After the foamed material 16 has been annealed and cooled to ambient temperature, it can be cut by non-illustrated means into smaller discrete forms of any desired size and shape.

After the loops 17 and 18 of the upper and lower portions 12 and 13 of the mold means 11 have separated from one another at the location 31, the loops 17 and 18 continue to move about the right hand wheels 19 and to move along the top and bottom of the furnace 14, where they are supported by external rollers 34, whereupon they continue to rotate about the left hand wheels 19 until they once again come into contact with one another at the location indicated by the arrow 35. As the loops 17 and 18 of the upper and lower portions 12 and 13 return to the inlet area of the furnace 14, they are continuously cleaned by brushes 36 and 37. In a preferred embodiment, as illustrated in the drawings, two sets of rotating wire brush arrays are provided, with the brushes 36 being coarse brushes, and the brushes 37 being fine brushes. These brushes 36, 37 clean off any material that has still adhered to the transverse mold members 20 or 26. After the loops 17 and 18 have been cleaned by the brushes 36 and 37, a release agent is continuously applied to the transverse mold members 20 and 26, for example by the nozzle means 38, prior to the material 28 being applied to the lower portion 13 ahead of the location 35 where the loop 17 and 18 once again come together. Such a release agent helps to prevent the material 28 from sticking to the transverse mold members 20 and 26 during the foaming process. Collection means, such as the dust collector 39, is provided to collect dust and spray from the area of the brushes 36 and 37, and possibly also from the area of the spray nozzle means 38.

As indicated previously, the transverse mold members 20 and 26 are secured to the chains 21 by means of pins 22. These pins are preferably easily removable so that the transverse mold members 20 and 26 can be easily removed or changed, even during operation of the apparatus 10. In addition, a great variety of differing transverse mold members and inserts therefor can be used. An example of such an insert is illustrated in FIG. 4c by the reference numeral 40. Other shapes of inserts could of course also be provided. Such inserts could be wedged into the cavities 23 of the sections 24, or could be secured therein by easily removable pins 41. Different sizes and shapes of transverse mold members can be used as desired with the same apparatus. As indicated above, the apparatus 10 can be reconfigured with different transverse mold members 20 and 26, and/or with inserts 40 for such mold members, while the apparatus and furnace are in operation.

The transverse mold members 20 and 21 are preferably made of stainless steel, such as stainless steel having a thickness of ⅛ inch, although any other suitable material that can withstand the hot furnace environment can also be used. In the direction of travel of the loops 17 and 18, the transverse mold members pursuant to one preferred embodiment have a width of 12 inches. In addition, as previously indicated, several sections 24 can be provided, as shown in FIG. 4a. In one specific embodiment, the center-to-center distance between the recesses 23 of such a section 24 can be six inches, with the base and height of the recess portion 23 being four inches and the opening being four and one quarter inch (see the mold detail of FIG. 4c). The furnace 14, which can be a standard tunnel-type furnace, can, in one specific embodiment, have a length of 110 feet, with the maximum distance between the looped ends of the lower portion 13 being 124 feet. The speed of the loops 17 and 18 of the mold means 11 through the furnace 14 can vary greatly and is generally a function of the length of the furnace.

Although in the embodiment specifically illustrated and described the loop 17 of the top portion 12 is provided with the profiled transverse mold members 20, and the loop 18 of the lower portion 13 is provided with the flat transverse mold members 26, the opposite arrangement is also possible. Furthermore, both the upper as well as the lower portion transverse mold members 20, 26 could be profiled.

The present invention is, of course, in no way restricted to the specific disclosure of the specification and drawings, but also encompasses any modifications within the scope of the appended claims.

What we claim is:

1. An apparatus for the manufacture of a continuous bar or strip of foamed glass material using a furnace at temperatures of at least 1250° F. comprising:

mold means that includes an upper portion and a lower portion that are each endless and cooperate with one another to form at least one closed and continuous mold cavity within said furnace; and at least one feeding spout for introducing material that is to be foamed in an unheated state to said mold means between said upper and lower portions thereof upstream of said furnace, whereby all heating steps are accomplished between said upper and lower portions of said mold means.

2. An apparatus according to claim 1, which further includes means disposed downstream of said furnace to aid in separating foamed material from said mold means, and in supporting such material.

3. An apparatus according to claim 1, wherein said upper portion and said lower portion of said mold means are each an endless moving loop formed of a plurality of sections that are secured to at least one chain disposed on an inner surface of said loop.

4. An apparatus according to claim 3, wherein each of said mold means loops are disposed about respective driven and freely rotatable wheels that are disposed externally of said furnace.

5. An apparatus according to claim 4, wherein downstream of said feed means, and throughout said furnace, said mold means loops cooperate with one another to form said closed mold cavity.

6. An apparatus according to claim 5, wherein said mold means loops, when viewed in a direction of travel thereof, have the respective portions thereof as they travel between separating means back to said feed means disposed externally of said furnace.

7. An apparatus according to claim 3, wherein each of said loop sections comprises at least one part and extends over the entire width of said loop as viewed in a direction perpendicular to a direction of movement of said loop.

8. An apparatus according to claim 3, wherein within said furnace, hold-down wheels and support wheels press respective portions of said loops of said upper and lower portions of said mold means toward one another.

9. An apparatus according to claim 3, wherein the sections of each of said mold means loops are secured to a plurality of continuous linked steel chains.

10. An apparatus according to claim 3, wherein said upper portion loop comprises a plurality of profiled corrugated sections, and said lower portion loop comprises a plurality of flat sections.

11. An apparatus according to claim 3, wherein both said upper portion loop and said lower portion loop comprise a plurality of profiled corrugated sections.

12. An apparatus according to claim 3, wherein at least one of said upper and lower portion loops comprises a plurality of profiled corrugated sections, and wherein exchangeable inserts are provided for installation in said corrugated sections.

13. An apparatus according to claim 3, wherein said loop sections are made of stainless steel.

14. An apparatus according to claim 2, wherein said means for separating foamed material from said mold means comprises scrapers acting on opposite sides of said foamed material downstream of said furnace.

15. An apparatus according to claim 1, which includes cleaning means in the form of brushes for cleaning surfaces of said upper and lower portions of said mold means after said foamed material has been separated therefrom.

16. An apparatus according to claim 1, which includes means for conveying separated foamed material to a tempering or annealing furnace.

17. A method of manufacturing a continuous bar or strip of foamed glass material using a furnace, including the steps of:

provforming a mold means that includes an upper portion and a lower portion that are each endless and cooperate with one another to form at least one closed and continuous mold cavity within said furnace;

introducing raw material that is to be foamed in an unheated state to said mold means between said upper and lower portions thereof upstream of said furnace;

moving said material on said mold means through said furnace at temperatures of at least 1250° F. to foam said material; and separating a continuous bar or strip of foamed material from said mold means downstream of said furnace.

18. A method according to claim 17, which includes the steps of forming each of said upper and lower portions of said mold means as an endless loop formed of a plurality of sections secured to at least one chain, and moving each of said loops through said furnace at the same speed.

19. A method according to claim 18, which includes the step of moving said loops through said furnace in a continuous manner or in a batch-wise manner.

20. A method according to claim 18, wherein said loop sections are exchangeable.

21. A method according to claim 18, wherein at least one of said upper and lower portion loops comprises a plurality of profiled corrugated sections, and which includes the step of providing exchangeable inserts for installation in said corrugated sections.

22. A method according to claim 17, which includes the step of conveying said separated foamed material to a tempering or annealing furnace.

* * * * *